United States Patent [19]
Cartwright

[11] 4,177,997
[45] Dec. 11, 1979

[54] FLOATING SEAL

[75] Inventor: John N. Cartwright, Indianapolis, Ind.

[73] Assignee: General Motors Corporation, Detroit, Mich.

[21] Appl. No.: 967,783

[22] Filed: Dec. 8, 1978

[51] Int. Cl.² ............... F16J 15/54; F16J 15/40
[52] U.S. Cl. ............................. 277/27; 277/83; 277/173; 277/181
[58] Field of Search ............... 277/83, 173–177, 277/181, 3, 188 R, 51, 27

[56] References Cited

U.S. PATENT DOCUMENTS

| | | | |
|---|---|---|---|
| 2,971,783 | 2/1961 | Laser | 277/83 X |
| 3,035,841 | 5/1962 | Riester | 277/83 X |
| 3,154,309 | 10/1964 | Voitik | 277/51 X |
| 3,179,422 | 4/1965 | Phillips | 277/27 X |
| 3,190,661 | 6/1965 | Wahl et al. | 277/51 X |
| 3,334,905 | 8/1967 | Horwitz et al. | 277/27 X |
| 3,356,290 | 12/1967 | Lehmann | 277/59 X |
| 3,617,068 | 11/1971 | Sprenger | 277/83 X |

Primary Examiner—Robert S. Ward, Jr.
Attorney, Agent, or Firm—J. C. Evans

[57] ABSTRACT

A high pressure floating ring assembly includes a floating ring having a sealing surface thereon closely fit with respect to the outer diameter of a cylindrical shaft and wherein relative motion occurs between the inside diameter of the floating ring and the outside diameter of the shaft. Passages are provided to produce a high differential pressure across the sides of the seal and a side thrust reaction pin is located in each of a plurality of circumferentially spaced openings formed in the seal housing and in the body of the seal thereby to define a close tolerance seal to housing gap which permits the floating ring to readily reposition while the shaft is radially shifted with respect to the seal either by misalignment or eccentric shaft motion.

4 Claims, 3 Drawing Figures

FLOATING SEAL

This invention relates to floating ring seals and, more particularly, to floating ring seals including means therein to accommodate eccentric motion in a rotary shaft sealed by the floating ring seals.

Floating ring seals that operate with a differential pressure thereacross may have a radial lockup tendency caused by side thrust exerted on the floating ring by the pressurized fluids that are sealed by the ring seal components. In the past, such side thrust was reduced to a minimum practical level by including a pressure balance cut on the downstream pressure side of the seal. However, remaining side thrust effects can produce noticeable resistance to free radial motion of the ring. In such cases, if the rotating shaft assumes a radially shifted position relative to a seal housing or operates with an eccentric motion while the seal is under a high pressure mode of operation, the floating ring seals can be worn by radial loads thereon and by rubbing of the shaft with respect to the wear surface of the seal.

Accordingly, an object of the present invention is to include an improved floating ring seal assembly having means therein for reducing the radial load required to reposition the floating ring under conditions of differential pressure load on the seal and wherein the means includes reaction pins that react against a floating ring seal side load to maintain a minimum gap between the downstream face of the floating ring seal and a facing portion of the seal support housing while maintaining reduced resistance to radial movement of the seal, thereby to accommodate eccentric motions of the shaft or realignment of the shaft with respect to the seal housing.

Yet another object of the present invention is to provide an improved floating seal assembly having annular floating seal components with a wear surface thereon and including cylindrical bores on the same downstream side of a depth to accommodate pins having a length that is controlled to maintain a close tolerance leakage path between the downstream side of the seal components and a facing surface of the housing for the components and wherein an anti-rotation stop is included on the floating seal components to insure full effective side thrust accommodation by the side thrust reaction pins.

Yet another object of the present invention is to provide an improved floating ring seal assembly having one or more axially spaced seal rings thereon, each including an anti-rotation stop component thereon and each further including a continuous annular side surface having a plurality of axially extending side load reaction pins therein, all joined at a fixed end thereon to a support housing for the seal rings and each of the pins extending into an annular groove in the seal ring having a depth and length to maintain a close tolerance for equal load sharing between each of a plurality of circumferentially spaced reaction pins on the continuous annular side surface and wherein the joined pins flex under load to produce bending of the pins at their fixed ends to maintain a minimum gap between the annular side surface of the floating ring and a facing portion of its support housing, thereby to reduce radial seal resistance to accommodate eccentric motions of the shaft thereby to maintain close positioning of a wear face on the seal ring and a rotary shaft at high rubbing speeds between the shaft and the wear face of the seal.

These and other objects of the present invention will be more readily apparent from embodiments of the invention shown in the drawing.

Figure 1:
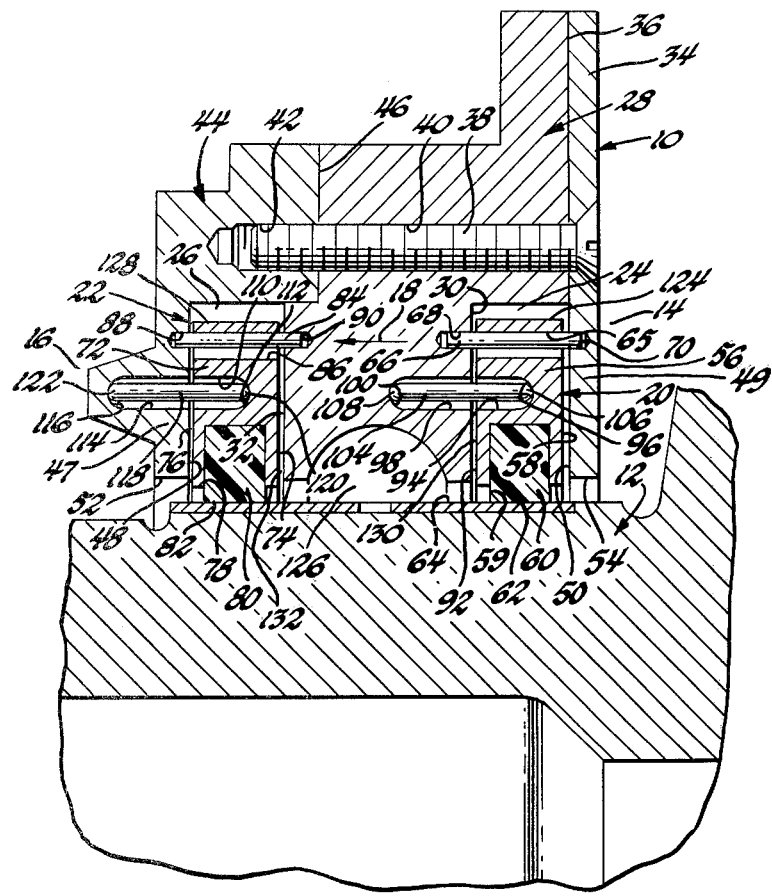
FIG. 1 is an enlarged fragmentary, longitudinal sectional view of a floating seal assembly, including the present invention.

Referring now to the drawings, in FIG. 1 a double floating ring seal assembly 10 is illustrated having a shaft 12 of a rotary machine directed therethrough. A high pressure fluid region 14 is present on one end of shaft 12 and a lower pressure region 16 is on the opposite end thereof. The direction of pressure force (side thrust) produced by the pressure differential between the regions 14, 16 is shown by the arrow 18 in FIG. 1.

A typical problem in such floating ring seals which operate with a high differential pressure between the region 14 and the region 16 is radial lockup caused by side forces exerted on the floating rings of the assembly. More particularly, in the illustrated arrangement, the assembly includes an upstream floating ring seal unit 20 and a downstream floating ring seal unit 22 located within housing openings 24, 26, respectively. The housing openings 24, 26, are defined by an intermediate housing member 28 including an upstream undercut shoulder 30 on one end thereof and a flat radial annular surface 32 on the opposite side thereof. An upstream end closure plate 34 is held against an upstream surface 36 on the intermediate housing member 28 by a suitable fastening means illustrated as a threaded screw 38 that extends through a bore 40 in the intermediate member 28 into threaded engagement with an internally threaded bore 42 on a downstream end closure member 44. The downstream end closure member 44 thereby has an inboard surface 46 thereon held against the downstream face 32 of the intermediate member 28 and includes a dependent leg 47 thereon with an inner surface 48 spaced from the surface 32 of the intermediate housing member 28 to form the housing opening 26 for the downstream floating ring seal unit 22. Likewise, the upstream end plate 34 has a dependent portion 49 thereof with an inboard surface 50 that cooperates with the undercut shoulder 30 of the intermediate member 28 to define the housing opening 24 of the upstream floating ring seal unit 20. Axially aligned bores 52, 54 are formed through the dependent leg portions 47, 49 of the downstream and upstream end closure members 34, 44, respectively, to receive the shaft 12 for rotation with respect to the seal housing members.

The upstream floating ring seal unit 20 includes a carriage ring 56 having an upstream facing, pressure surface 58 thereon and includes an annular channel opening 59 therein in which an annular seal element 60 is supportingly received. Element 60 has a wear surface 62 thereon slidably engaged with an outer surface 64 on the shaft 12. The carriage ring 56 includes an axial slot 65 formed therethrough at the upper end thereof which has an anti-rotation pin 66 directed therethrough with its opposite ends received in aligned bores 68, 70 formed in the intermediate housing member 28 and the upstream end closure 34. The axial slot 65 has a depth greater than that of the pin 66 so that the carriage ring 56 can float radially within the opening 24. Likewise, the downstream floating ring seal unit 22 has a carriage ring 72 with an upstream pressure surface 74 thereon and a downstream pressure surface 76. The carriage ring 72 includes an inboard channel 78 in which is supportingly received an annular seal element 80 having a wear surface 82 thereon in sliding, sealing relationship with outer surface 64 of shaft 12.

The carriage ring 72 is held against rotation by an anti-rotation pin 84 that is located within an axial slot 86 through the radially outer portion of the carriage ring 72. The pin 84 has its opposite ends received in aligned bores 88, 90 formed respectively in the downstream end closure member 44 and the intermediate housing member 28. The depth of the slot 86 is greater than that of the diameter of pin 84 so that the carriage ring 72 is free to move in a radial direction within the opening 86.

In accordance with certain principles of the present invention, the downstream surface 76 on the carriage ring 72 and a like downstream surface 92 on the upstream carriage ring 56 are maintained at a minimum gap relationship with respect to the adjacent housing surface 48 and shoulder 30, respectively. To accomplish this result, the upstream carriage ring 56 includes a plurality of circumferentially spaced, cylindrical bores, one of which is shown at 94 in FIG. 1. The end of the cylindrical opening 94 includes a hemi-spherically formed bearing surface 96 thereon. A plurality of circumferentially spaced cylinder bores 98 are formed in shoulder 30. Each bore 98 has a hemi-spherical bearing surface 100 at the inboard end thereof. The bores 94, 98 are axially aligned and each of them receives a thrust pin 104 having rounded end portions 106, 108 supportingly engaged with the hemi-spherical bearing surfaces 96, 100 formed within the floating carriage ring 56 and the intermediate housing member 28, respectively. Likewise, the downstream ring seal unit 22 includes a plurality of circumferentially spaced cylindrical bores 110 therein, each having an inboard hemi-spherical bearing surface 112. The downstream closure member 44 also has a plurality of cylindrical bores 114 formed therein located at circumferentially spaced points on the surface 48. Each of the bores 114 includes a hemi-spherical bearing surface 116 therein. The cylindrical bores 110, 114 are axially aligned and each of them receives a thrust bearing pin 118 having rounded ends 120, 122 thereon engaged with the hemi-spherical bearing surfaces 112, 116, respectively.

By virtue of the aforedescribed structure, when fluid pressure is in the high pressure region 14, a high pressure condition exists within the opening 24 which is balanced between the surfaces 58 and 92 on the upstream seal carriage ring 56.

Side loads can be produced by pressure forces acting on the surface 58 and on the surface 74 of the rings 56, 72, respectively. Such side loads are accommodated in part in prior arrangements by provision of a pressure balance cut formed on the downstream faces of such seals. In heavily pressure loaded seals, however, side thrust force remains high and in some cases can close a desired minimum gap between the floating carriage rings and adjacent housing surfaces. If a rotating shaft assumes a different position relative to the seal housing components or operates with a slight eccentric motion while the seal is under such side loads, the seal rings may bind on the downstream surfaces of the housings and no longer freely float. Accordingly, in the present invention, the plurality of thrust pins 104 serve to accommodate differential pressure loads across the ring 56. The floating ring side load is reacted by the rounded ends 108, 106 on each of the thrust pin 104 and the parts have a closely controlled tolerance so that a minimum dimension gap 130 will be maintained continuously between the ring 56 and the facing shoulder 30 on the intermediate housing member 28. As a result, when the shaft 12 moves with respect to the housing components in a radial direction, the carriage ring 56 will float within the opening 24 to accommodate for the change in operating position of the shaft 12. The same result is produced by the component parts of the downstream floating seal unit 22 which has a minimum dimensions gap 132. As result, a minimum gap between the downstream surfaces of the floating seal units 20, 22 and adjacent housing surfaces is maintained to minimize leakage across the seal components from the high pressure region 14 to the low pressure region 16. At the same time, the load necessary to move the seal units 20, 22 radially is reduced. Accordingly, seal wear and seal leakage are improved.

Figure 2:
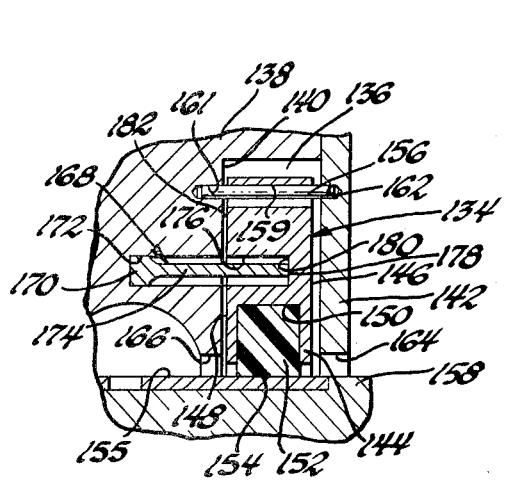
FIG. 2 is a fragmentary sectional view of a single ring seal including a modified embodiment of the present invention.
Figure 3:
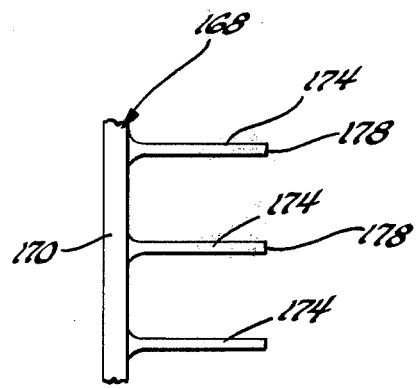
FIG. 3 is a fragmentary elevational view of a multi-pin ring for accommodating thrust in the embodiment of FIG. 2.

Referring now to the embodiment in FIG. 2, an upstream floating seal unit 134 is illustrated located within a housing opening 136 formed by an intermediate housing member 138, a portion of which is shown in FIG. 2, including an upstream undercut surface 140 thereon. An upstream end closure 142 is held against the undercut surface 140 to bound opening 136. In this embodiment, the upstream seal unit 134 includes a floating carriage ring 144 having an upstream surface 146 thereon and a downstream surface 148 thereon. An annular channel 150 is formed on the radially inner surface of the carriage ring 144 and receives an annular seal element 152 with its wear surface 154 in sliding engagement with an outer seal surface 155 on rotating shaft 158. The aforedescribed components are fixed against rotation by an antirotation pin 156 directed through a slot 159 in ring 144 of greater depth than that of the diameter of the pin 156. The opposite ends of the pin 156 are supported in housing bores 161, 162 formed in the intermediate member 138 and the upstream end closure 142 to prevent rotation of the floating seal carriage 144 within the opening 136. Aligned bores 164, 166 in the closure 142 and intermediate housing member 138 accommodate eccentric motion of the shaft 158. Low forces are required for such radial movement because an annular, multiple pin thrust member 168 is utilized in place of the plurality of thrust pins 104, 118 described in the embodiment in FIG. 1. More particularly, the multiple pin thrust member 168 includes a generally rectangularly configured base portion 170 supportingly received within an annular groove 172 formed in the undercut surface 140 of the intermediate housing member 138. The thrust ring 168 includes a plurality of axially directed spaced pins 174 thereon, each of which is directed into a slot 176 formed in the carriage 144. When a pressure load is applied on the surface 146, the carriage is shifted in a downstream direction so that end surfaces 178 on each of the pins will engage a slot surface 180. The length of each of the pins 174 is selected so that a carefully controlled clearance gap 182 will be held between the carriage 144 and the housing components. In this arrangement, radial flexure of the member 168 under radial loading produces bending of the pins 174 from the fixed end of the base 170 thereof to readily accommodate unrestrained radial movement of the floating seal 134. The gap 182 will prevent side frictional engagement between the carriage element 144 and adjacent housing portions. The gap 182 is selected, however, to prevent excessive leakage across the seal unit.

While the embodiments of the present invention, as herein disclosed, constitute a preferred form, it is to be understood that other forms might be adopted.

The embodiments of the invention in which an exclusive property or privilege is claimed are defined as follows:

1. A floating ring seal assembly for accommodating eccentric shaft motions in a high speed rotary device comprising a seal housing having spaced internal side walls defining an annular opening, an axial bore extending through said housing for receiving an axial extension of a drive shaft for a rotary machine and including a seal surface thereon, a seal carriage located in said annular opening, a wear seal element supported by said seal carriage and having a radially inwardly located surface thereon in engagement with the seal surface of said shaft, means to support said carriage against rotation with respect to said seal housing and including means to permit floating radial movement of said carriage within said opening, spacer means to accommodate axial thrust on said seal carriage produced by the fluid pressure force thereon, said means being configured to maintain a minimal gap between said seal carriage and one of said internal walls of said seal housing to control leakage of pressure around said seal element to a low pressure return region whereby the minimum gap is maintained during periods of operation with substantial high pressure produced side thrust on said seal carriage thereby permitting free radial adjustment of said seal carriage during rotation of the shaft within the bore without contact between said carriage and the one of said internal walls to prevent frictional forces causing resistance to radial motion of said carriage within said openings thereby to assure reduced loading of the seal wear face against the seal surface of the shaft during all phases of operation thereof.

2. A floating ring seal assembly for accommodating eccentric shaft motions in a high speed rotary device comprising a seal housing having spaced internal side walls defining an annular opening, an axial bore extending through said housing for receiving an axial extension of a drive shaft for a rotary machine and including a seal surface thereon, a seal carriage located in said annular opening, a wear seal element supported by said seal carriage and having a radially inwardly located surface thereon in engagement with the seal surface of said shaft, means to support said carriage against rotation with respect to said seal housing and including means to permit floating radial movement of said carriage within said opening, spacer means to accommodate axial thrust on said seal carriage produced by the fluid pressure force thereon, said means being configured to maintain a minimal gap between said seal carriage and one of said internal walls of said seal housing to control leakage of pressure around said seal element to a low pressure return region whereby the minimum gap is maintained during periods of operation with a substantial high pressure produced side thrust on said seal carriage thereby permitting free radial adjustment of said seal carriage during rotation of the shaft within the bore without contact between said carriage and the one of said internal walls to prevent frictional forces causing resistance to radial motion of said carriage within said openings thereby to assure reduced loading of the seal wear face against the seal surface of the shaft during all phases of operation thereof, said spacer means including aligned bores in said carriage and said one of said walls, each of said aligned bores having a hemispherical bearing surface at the end thereof and a thrust pin extending through each pin having rounded ends engaging said bearing surfaces to closely maintain said minimal gap.

3. A floating ring seal assembly for accommodating eccentric shaft motions in a high speed rotary device comprising a seal housing having spaced internal side walls defining an annular opening, an axial bore extending through said housing for receiving an axial extension of a drive shaft for a rotary machine and including a seal surface thereon, a seal carriage located in said annular opening, a wear seal element supported by said seal carriage and having a radially inwardly located surface thereon in engagement with the seal surface of said shaft, means to support said carriage against rotation with respect to said seal housing and including means to permit floating radial movement of said carriage within said opening, spacer means to accommodate axial thrust on said seal carriage produced by the fluid pressure force thereon, said means being configured to maintain minimal gap between said seal carriage and one of said internal walls of said seal housing to control leakage of pressure around said seal element to a low pressure return region whereby the minimum gap is maintained during periods of operation with substantial high pressure produced side thrust on said seal carriage thereby permitting free radial adjustment of said seal carriage during rotation of the shaft within the bore without contact between said carriage and the one of said internal walls to prevent frictional forces causing resistance to radial motion of said carriage within said openings thereby to assure reduced loading of the seal wear face against the seal wear surface of the shaft during all phases of operation thereof, said spacer means including aligned slots in said carriage and said one of said walls, at least one of said slots being annular, a thrust member having an annular base in said annular slot and a plurality of free ended pins extending from said base into the other of said slots, said pins and ring extending axially between said carriage and said one of said walls and axially engaging them at the base and pin free ends to closely maintain said minimal gap.

4. A high pressure floating ring seal assembly for accommodating eccentric shaft motions in a high speed rotary device comprising: a seal housing having a pair of axially spaced annular openings, each having spaced internal side walls, an axial bore extending through said housing for receiving an axial extension of a drive shaft for a rotary machine and including a seal surface thereon, a seal carriage located in each of said axially spaced openings, a wear seal element supported by said seal carriage and having a radially inwardly located wear surface thereon in engagement with the seal surface of said shaft, means to support each of said carriages against rotation with respect to said seal housing and including means to permit floating radial movement of said carriage within each of said openings, means to accommodate axial thrust on each of said seal carriages produced by the fluid pressure force thereon, said means being configured to maintain a minimal gap between each of said seal carriages and an internal wall of said seal housing to control leakage of pressure around each of said seal elements to a low pressure return region whereby the minimum gap is maintained during periods of operation with substantial high pressure produced side thrust on each of said seal carriages thereby permitting free radial adjustment of each of said seal carriages during rotation of the shaft within the bore without contact between each of said carriages and the other of said internal side walls to prevent friction forces causing resistance to radial motion of said carriages within said openings thereby to assure reduced loading of the seal wear face against the seal surface of the shaft during all phases of operation thereof.

* * * * *